(12) United States Patent
Chiu

(10) Patent No.: US 6,588,536 B1
(45) Date of Patent: Jul. 8, 2003

(54) SAND VEHICLE

(75) Inventor: Hsien-Lung Chiu, Taichung Hsien (TW)

(73) Assignee: Jenn Jianq Co., Ltd., Taichung Hsien (TW)

( * ) Notice: Subject to any disclaimer, the term of this patent is extended or adjusted under 35 U.S.C. 154(b) by 25 days.

(21) Appl. No.: 10/034,501

(22) Filed: Dec. 28, 2001

(51) Int. Cl.⁷ .............................................. B62D 21/00
(52) U.S. Cl. ................................ 180/312; 280/124.109
(58) Field of Search .............................. 180/311, 312, 180/299, 215, 219; 280/124.109, 781, 785, 798, 124.145, 124.179; 296/204, 205

(56) References Cited

U.S. PATENT DOCUMENTS

| | | | |
|---|---|---|---|
| 4,662,467 A | * | 5/1987 | Arai et al. ................... 180/210 |
| 4,735,275 A | * | 4/1988 | Tsukahara et al. .......... 180/215 |
| 5,330,028 A | * | 7/1994 | Handa et al. ................ 180/219 |
| 5,704,442 A | * | 1/1998 | Okazaki et al. ............. 180/219 |
| 5,855,250 A | * | 1/1999 | Nishi .......................... 180/312 |
| 6,412,856 B1 | * | 7/2002 | Kajikawa et al. ...... 296/203.01 |

* cited by examiner

Primary Examiner—Paul N. Dickson
Assistant Examiner—Faye M. Fleming
(74) Attorney, Agent, or Firm—Alan D. Kamrath; Rider Bennett, LLP.

(57) ABSTRACT

A sand vehicle has a main frame, an auxiliary frame disposed in the main frame, a rear shaft, a pair of connection bars, and a first and a second positioning seats disposed on the auxiliary frame, a pair of torsion-resistant elements, a pair of sleeves disposed on the first positioning seat to receive the torsion-resistant elements, a connection frame disposed on the main frame, a pair of positioning bars disposed on the main frame, the main frame having two rear distal bars, a pair of pivot shafts, a pair of torsion-resistant members, a pair of collars to receive the torsion-resistant members, a pair of connection rods connected to the collars and the pivot shafts, and two rear wheels connected to the rear shaft. Each rear distal bar of the main frame has a pivot aperture. Each positioning bar has a pivot hole. The torsion-resistant elements are disposed between the positioning bars. The collars are disposed in the second positioning seat. The pivot shafts are disposed on the rear distal bars. A pair of shock absorbers are disposed between the connection frame and the connection bars.

3 Claims, 7 Drawing Sheets

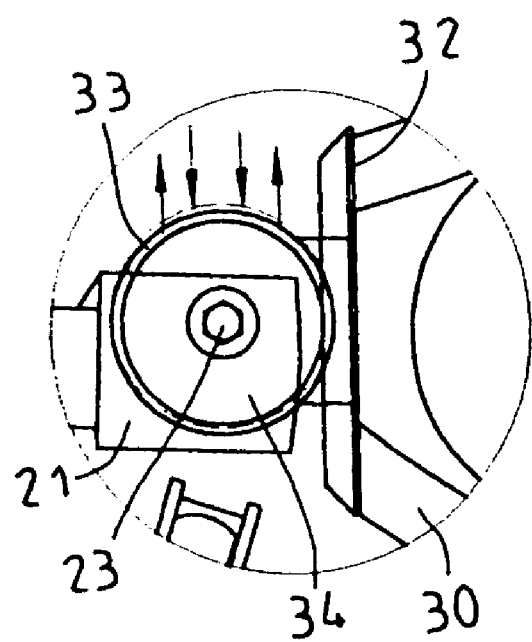
F I G. 4A

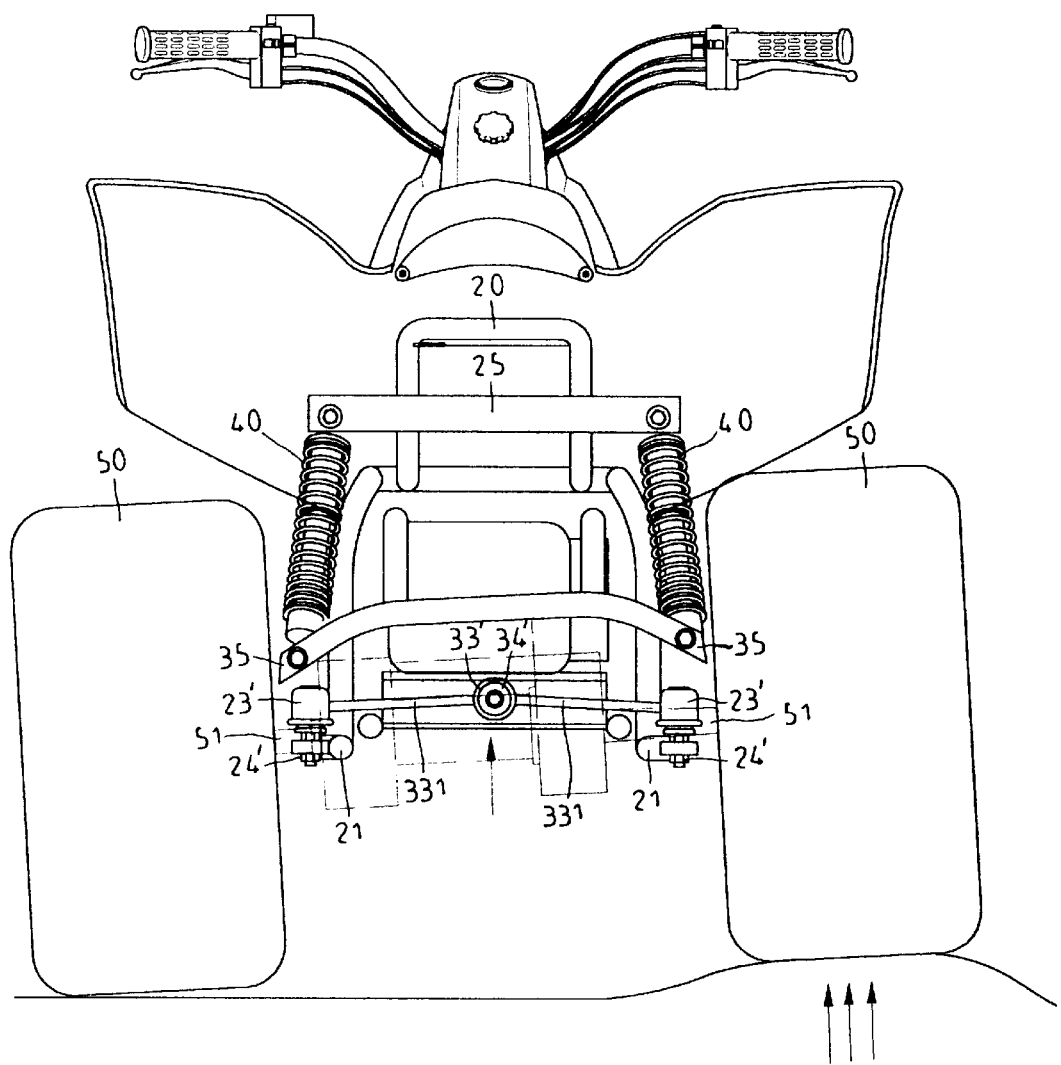
F I G. 6

SAND VEHICLE

BACKGROUND OF THE INVENTION

The present invention relates to a sand vehicle. More particularly, the present invention relates to a sand vehicle which increases a balance of a main frame and decrease a vibration of the main frame.

Referring to FIGS. 1 and 2, a conventional sand vehicle has a main frame 10, an engine 11 disposed on the main frame 10, a shock absorber 13 disposed on a rear portion of the main frame 10, a rear shaft 12 disposed on the rear portion of the main frame 10, and two rear wheels 14 connected to the rear shaft 12. When a user turns his body rightward or leftward, the engine 11 will deflect rightward or leftward also. Thus the conventional sand vehicle will be overturned because of the instability of the center of gravity. Furthermore, one shock absorber 13 for two rear wheels 14 cannot decrease a vibration of the conventional sand vehicle effectively while the user drives the conventional sand vehicle on an uneven road.

SUMMARY OF THE INVENTION

An object of the present invention is to provide a sand vehicle which has an auxiliary frame disposed in a main frame, an engine disposed in the auxiliary frame and a shaft disposed on a rear portion of the auxiliary frame so that the balance of the main frame will not be influence by the auxiliary frame while the auxiliary frame is deflected.

Another object of the present invention is to provide a sand vehicle which has a pair of torsion-resistant elements and a pair of torsion-resistant members to be deformed and restored to their original configurations so that a main frame will not be deflected in order to stabilize the center of gravity of the main frame.

Another object of the present invention is to provide a sand vehicle which has a pair of shock absorbers for a pair of rear wheels in order to decrease a vibration of the sand vehicle effectively while the sand vehicle is driven on an uneven road.

Accordingly, a sand vehicle comprises.a main frame, an auxiliary frame disposed in the main frame, an engine disposed in the auxiliary frame, a rear shaft disposed on a rear portion of the auxiliary frame, a first positioning seat disposed on a front portion of the auxiliary frame, a second positioning seat disposed on the rear portion of the auxiliary frame, a pair of torsion-resistant elements, a pair of sleeves disposed on the first positioning seat to receive the torsion-resistant elements, a pair of connection bars disposed on the rear portion of the auxiliary frame, a connection frame disposed on a rear portion of the main frame, a pair of positioning bars disposed on a front portion of the main frame to match the first positioning seat, the main frame having two rear distal bars, a pair of pivot shafts, a pair of torsion-resistant members, a pair of collars to receive the torsion-resistant members, a pair of connection rods connected to the collars and the pivot shafts, and two rear wheels connected to the rear shaft. Each of the rear distal bars of the main frame has a pivot aperture. Each of the positioning bars has a pivot hole. The torsion-resistant elements are disposed between the positioning bars. A pivot screw rod fastens the torsion-resistant elements and the positioning bars together. The collars are disposed in the second positioning seat. The pivot shafts are disposed on the rear distal bars. Each of the pivot shafts passes through the corresponding pivot aperture of the rear distal bars. A pair of shock absorbers are disposed between the connection frame and the connection bars.

BRIEF DESCRIPTION OF THE DRAWINGS

FIG. 4A is an elevational view of a sleeve and a torsion-resistant element;

FIG. 6 is a schematic view illustrating a buffer state of a sand vehicle of a preferred embodiment in accordance with the present invention.

DETAILED DESCRIPTION OF THE INVENTION

Figure 1:
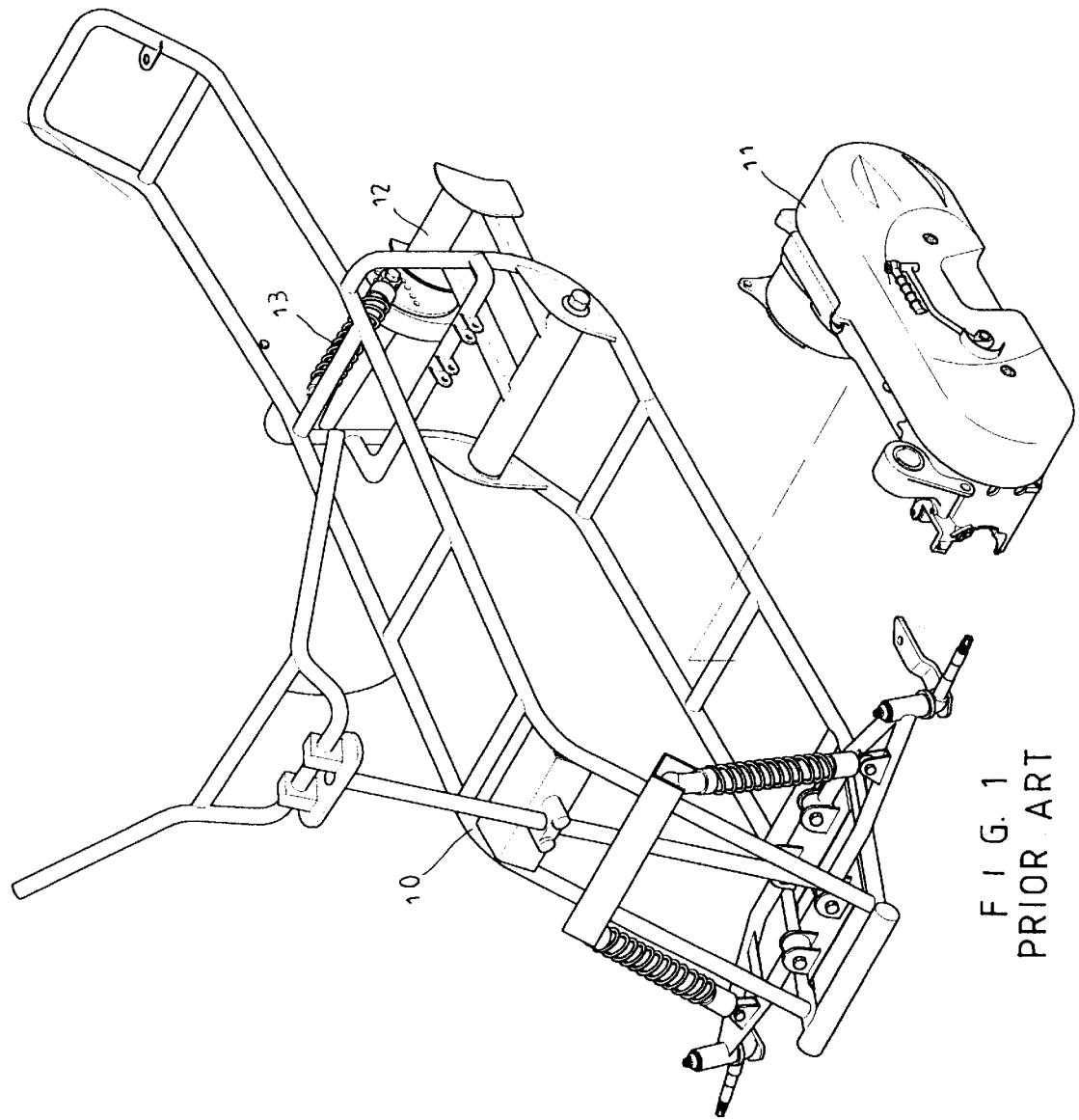
FIG. 1 is a perspective exploded view of a sand vehicle of the prior art.
Figure 2:
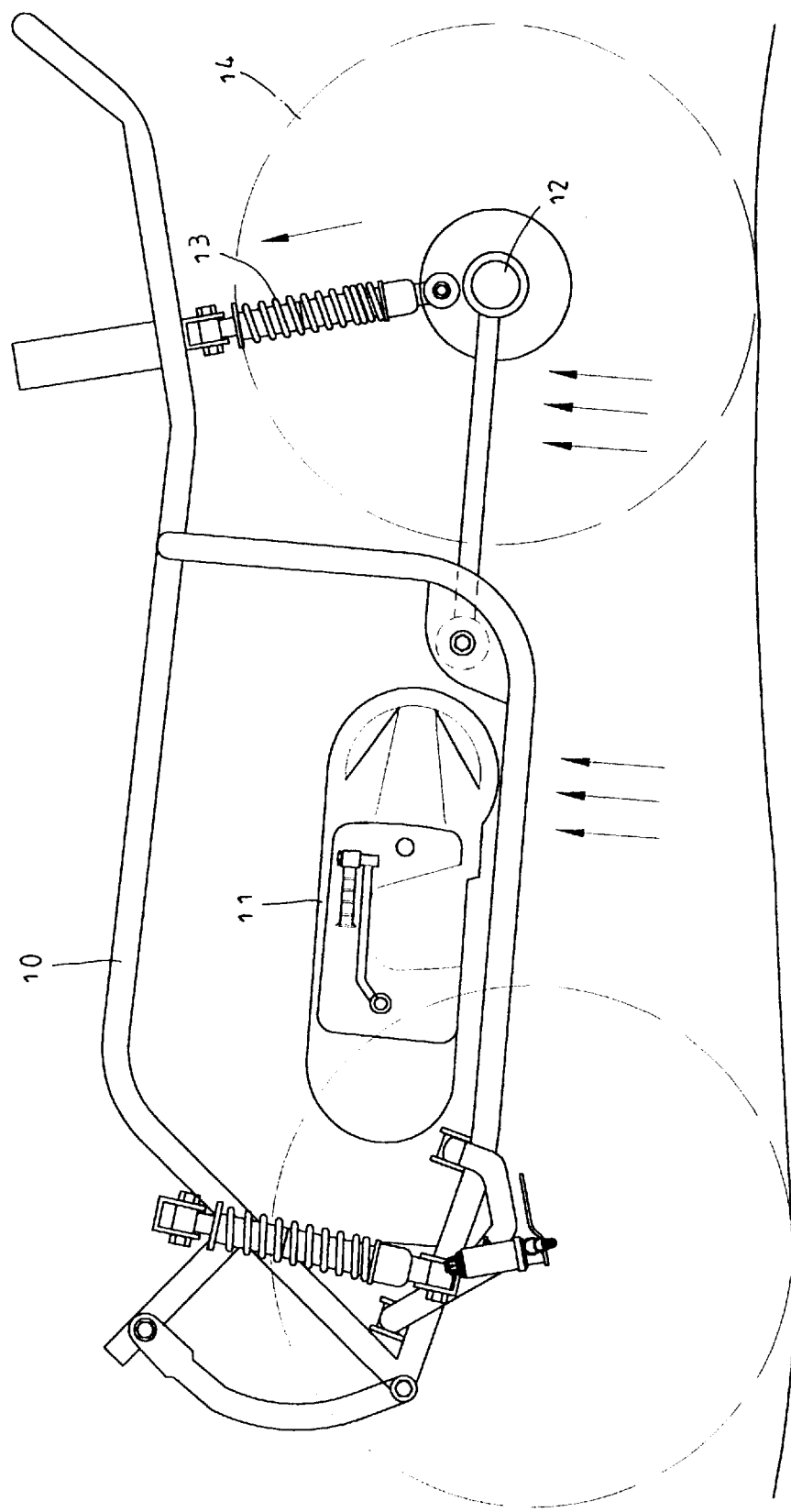
FIG. 2 is an elevational view of a sand vehicle of the prior art.
Figure 3:
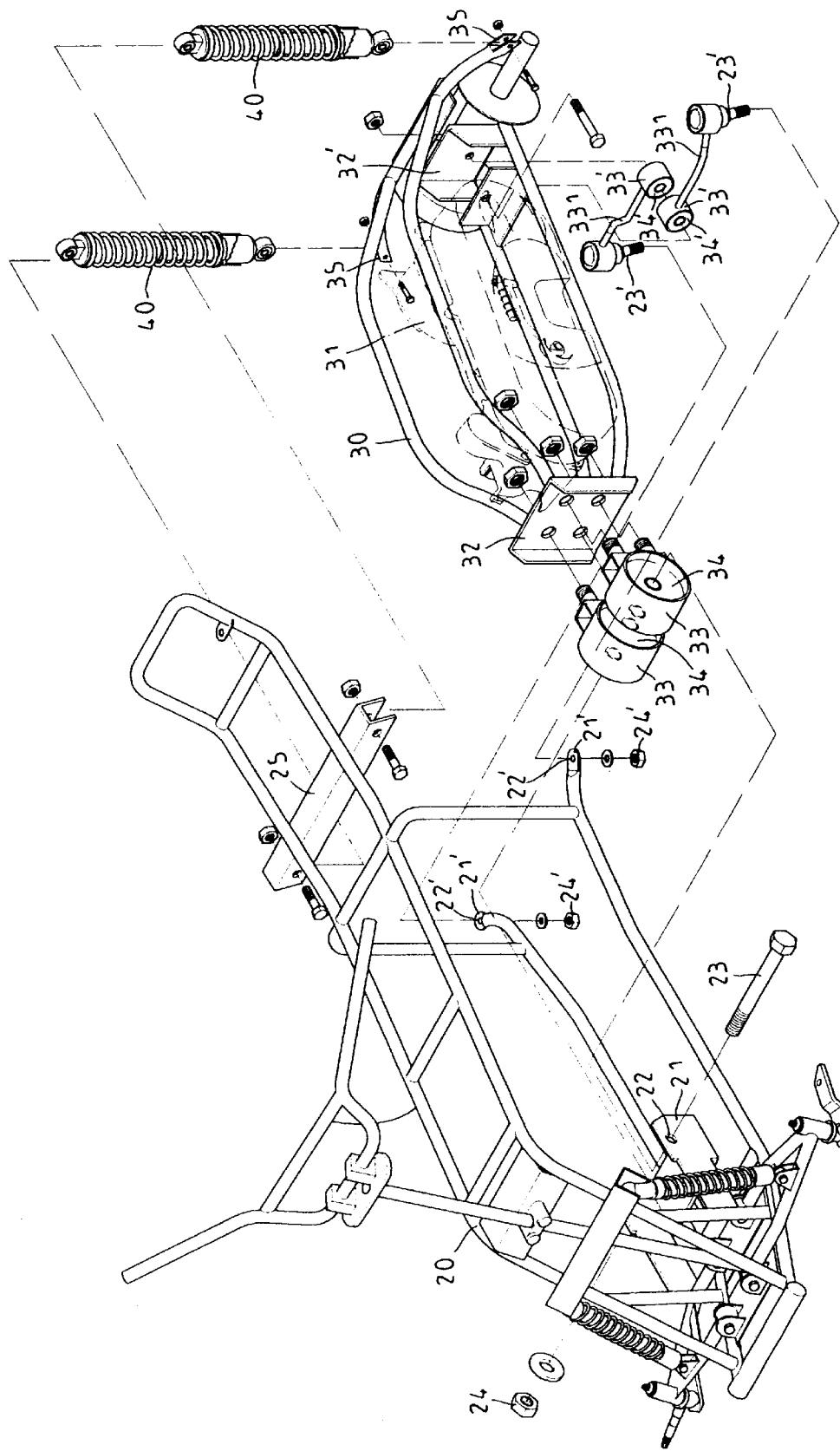
FIG. 3 is a perspective exploded view of a sand vehicle of a preferred embodiment in accordance with the present invention.
Figure 4:
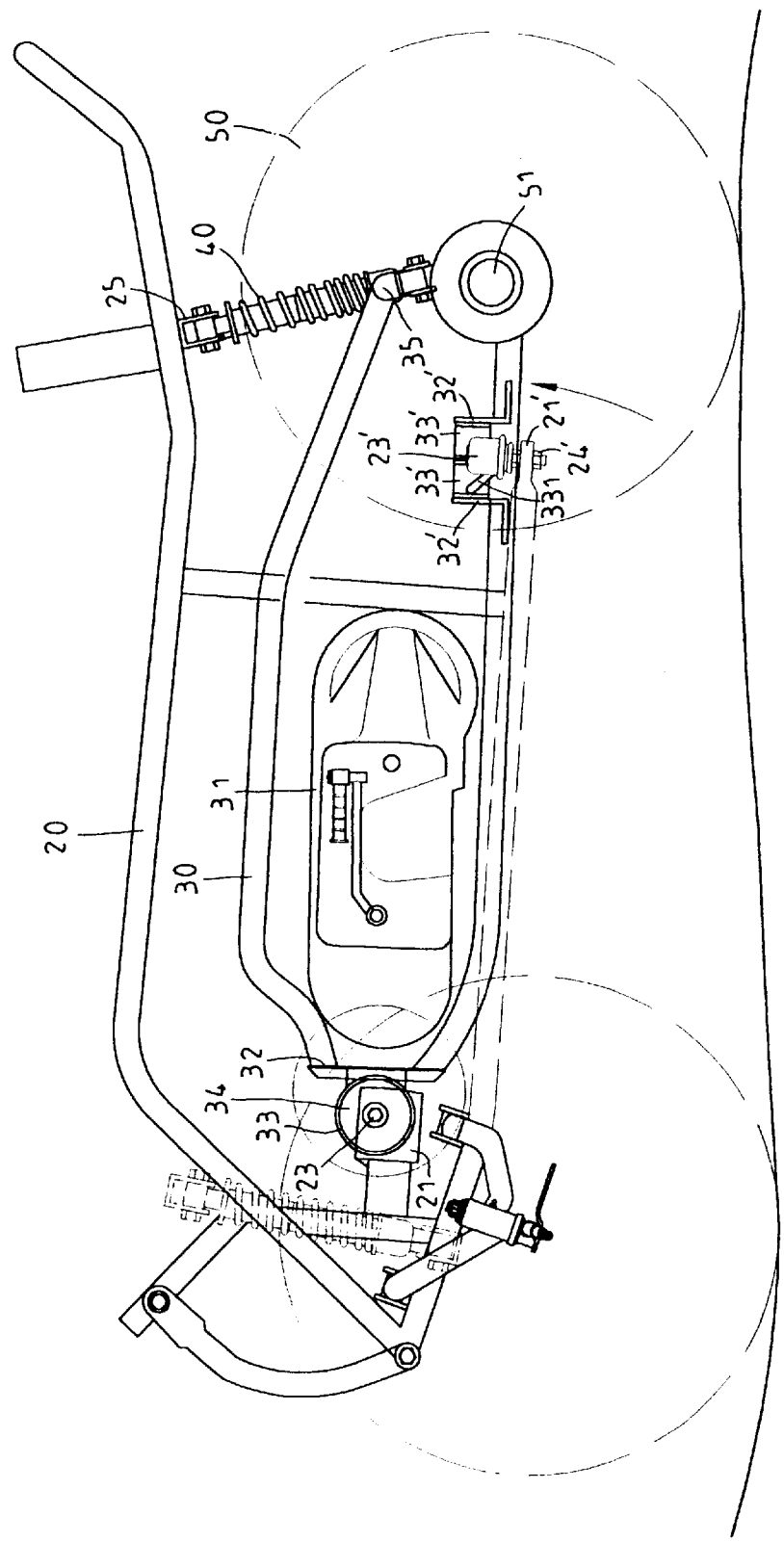
FIG. 4 is an elevational view of a sand vehicle of a preferred embodiment in accordance with the present invention.
Figure 5:
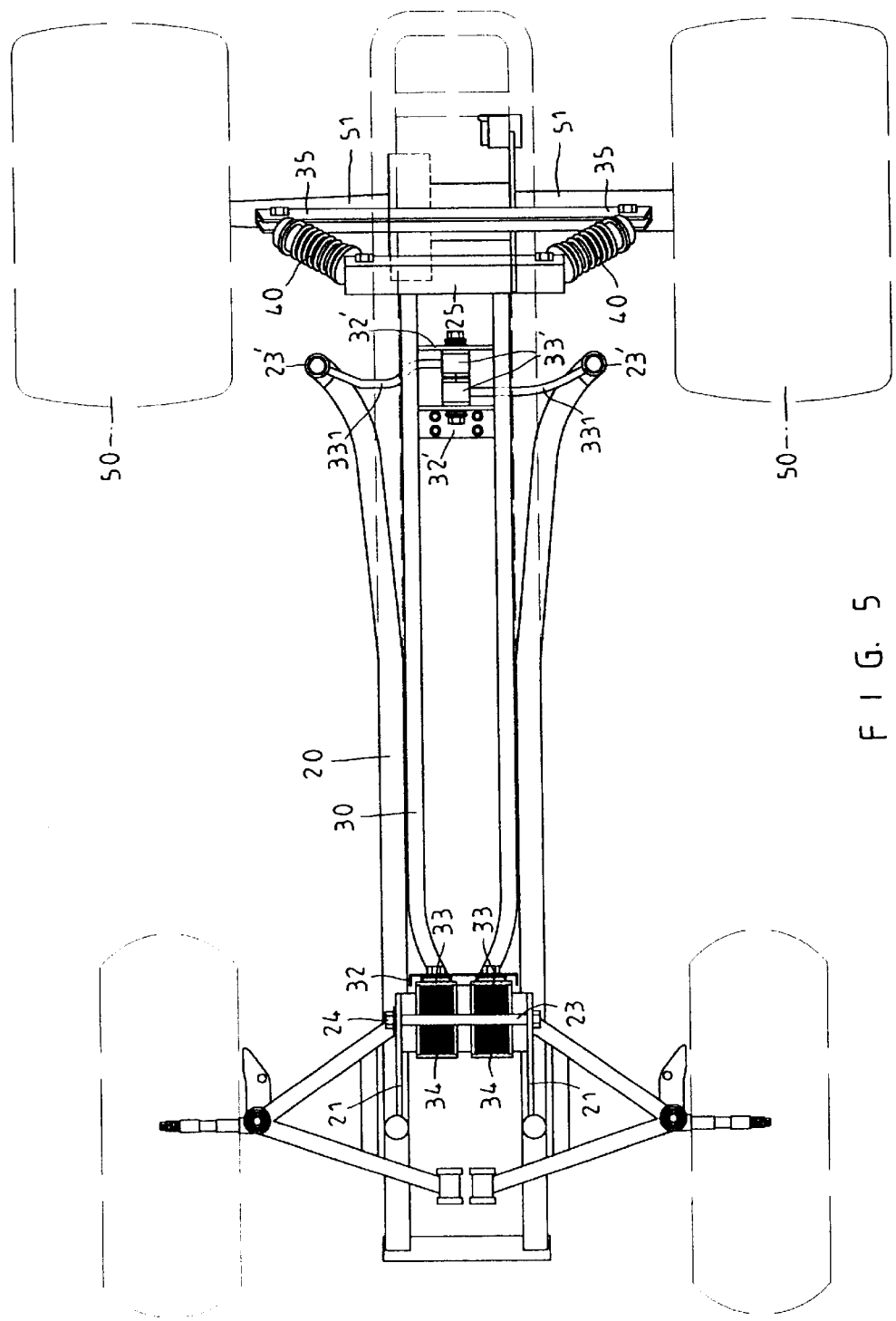
FIG. 5 is a schematic view illustrating a balance state of a sand vehicle of a preferred embodiment in accordance with the present invention.

Referring to FIGS. 3 to 6, a sand vehicle comprises a main frame 20, an auxiliary frame 30 disposed in the main frame 20, an engine 31 disposed in the auxiliary frame 30, a rear shaft 51 disposed on a rear portion of the auxiliary frame 30, a first positioning seat 32 disposed on a front portion of the auxiliary frame 30, a second positioning seat 32' disposed on the tear portion of the auxiliary frame 30, a pair of torsion-resistant elements 34, a pair of sleeves 33 disposed on the first positioning seat 32 to receive the torsion-resistant elements 34, a pair of connection bars 35 disposed on the rear portion of the auxiliary frame 30, a connection frame 25 disposed on a rear portion of the main frame 20, a pair of positioning bars 21 disposed on a front portion of the main frame 20 to match the first positioning seat 32, the main frame 20 having two rear distal bars 21', a pair of pivot shafts 23', a,pair of torsion-resistant members 34', a pair of collars 33' to receive the torsion-resistant members 34', a pair of connection rods 331 connected to the collars 33' and the pivot shafts 23', and two rear wheels 50 connected to the rear shaft 51.

Each of the rear distal bars 21' of the main frame 20 has a pivot aperture 22'.

Each of the positioning bars 21 has a pivot hole 22.

The torsion-resistant elements 34 are disposed between the positioning bars 21.

A pivot screw rod 23 fastens the torsion-resistant elements 34 and the positioning bars 21 together.

A nut 24 engages with the pivot screw rod 23.

The collars 33' are disposed in the second positioning seat 32'.

The pivot shafts 23' are disposed on the rear distal bars 21'.

Each of the pivot shafts 23' passes through the corresponding pivot aperture 22' of the rear distal bars 21' to engage with a nut 24'.

A pair of shock absorbers 40 are disposed between the connection frame 25 and the connection bars 35.

Each of the torsion-resistant elements 34 is made of rubber. Each of the torsion-resistant members 34' is made of rubber.

The present invention provides the engine 31 disposed in the auxiliary frame 30 and the rear shaft 51 disposed on the rear portion of the auxiliary frame 30 so that the balance of the main frame 20 will not be influence by the auxiliary frame 30 while the auxiliary frame 30 is deflected.

The present invention provides a pair of torsion-resistant elements 34 and a pair of torsion-resistant members 34' to be deformed and restored to their original configurations so that the main frame 20 will not be deflected in order to stabilize the center of gravity of the main frame 20.

The present invention provides a pair of shock absorbers 40 for a pair of rear wheels 50 in order to decrease a vibration of the sand vehicle effectively while the sand vehicle is driven on an uneven road.

The invention is not limited to the above embodiment but various modification thereof may be made. Further, various changes in form and detail may be made without departing from the scope of the present invention.

I claim:

1. A sand vehicle comprises:

a main frame, an auxiliary frame disposed in the main frame, an engine disposed in the auxiliary frame, a rear shaft disposed on a rear portion of the auxiliary frame, a first positioning seat disposed on a front portion of the auxiliary frame, a second positioning seat disposed on the rear portion of the auxiliary frame, a pair of torsion-resistant elements, a pair of sleeves disposed on the first positioning seat to receive the torsion-resistant elements, a pair of connection bars disposed on the rear portion of the auxiliary frame, a connection frame disposed on a rear portion of the main frame, a pair of positioning bars disposed on a front portion of the main frame to match the first positioning seat, the main frame having two rear distal bars, a pair of pivot shafts, a pair of torsion-resistant members, a pair of collars to receive the torsion-resistant members, a pair of connection rods connected to the collars and the pivot shafts, and two rear wheels connected to the rear shaft, each of the rear distal bars of the main frame having a pivot aperture, each of the positioning bars having a pivot hole, the torsion-resistant elements disposed between the positioning bars, a pivot screw rod fastening the torsion-resistant elements and the positioning bars together, the collars disposed in the second positioning seat, the pivot shafts disposed on the rear distal bars, each of the pivot shafts passing through the corresponding pivot aperture of the rear distal bars, and a pair of shock absorbers disposed between the connection frame and the connection bars.

2. The sand vehicle as claimed in claim 1, wherein each of the torsion-resistant elements is made of rubber.

3. The sand vehicle as claimed in claim 1, wherein each of the torsion-resistant members is made of rubber.

* * * * *